US007925201B2

(12) United States Patent
Irvin et al.

(10) Patent No.: US 7,925,201 B2
(45) Date of Patent: Apr. 12, 2011

(54) SHARING MEDIA CONTENT AMONG FAMILIES OF BROADCAST STATIONS

(75) Inventors: William Irvin, Laguna Beach, CA (US); Chad E. Steelberg, Newport Beach, CA (US); Ryan S. Steelberg, Irvine, CA (US); Matt Chalawsky, Los Angeles, CA (US); Dipankar Gupta, Irvine, CA (US); Bradley D. Townsend, Irvine, CA (US); Jeffrey W. Houston, Lake Forest, CA (US)

(73) Assignee: Wideorbit, Inc., San Francisco, CA (US)

( * ) Notice: Subject to any disclaimer, the term of this patent is extended or adjusted under 35 U.S.C. 154(b) by 591 days.

(21) Appl. No.: 11/735,262

(22) Filed: Apr. 13, 2007

(65) Prior Publication Data

US 2008/0256080 A1    Oct. 16, 2008

(51) Int. Cl.
*H04H 60/09* (2008.01)
*H04H 40/00* (2008.01)
*H04M 3/42* (2006.01)
*H04M 1/725* (2006.01)
*H04B 7/00* (2006.01)

(52) U.S. Cl. ........................ 455/3.01; 455/3.06; 455/66.1; 455/344; 455/414.1

(58) Field of Classification Search .................. 707/10; 455/3.01, 3.06, 3.04, 412.1, 414.1, 344
See application file for complete search history.

(56) References Cited

U.S. PATENT DOCUMENTS

| 4,517,562 | A |   | 5/1985  | Martinez          |         |
|-----------|---|---|---------|-------------------|---------|
| 4,665,514 | A |   | 5/1987  | Ching et al.      |         |
| 4,723,285 | A |   | 2/1988  | Le Roy et al.     |         |
| 4,841,357 | A |   | 6/1989  | Gillies           |         |
| 4,845,658 | A | * | 7/1989  | Gifford           | 709/217 |
| 4,864,620 | A |   | 9/1989  | Bialick           |         |
| 5,096,195 | A |   | 3/1992  | Gimmon            |         |
| 5,129,036 | A |   | 7/1992  | Dean et al.       |         |
| 5,260,778 | A |   | 11/1993 | Kauffman et al.   |         |
| 5,303,326 | A |   | 4/1994  | Dean et al.       |         |
| 5,440,351 | A |   | 8/1995  | Ichino            |         |
| 5,515,098 | A | * | 5/1996  | Carles            | 725/35  |

(Continued)

FOREIGN PATENT DOCUMENTS

CN    1285079 A    2/2001

(Continued)

OTHER PUBLICATIONS

"By Using Multicast, Wireless Communication, New Information Can Be Distributed," Nikkei Internet Technology, Sep. 22, 1997, pp. 106-111, vol. 3. (in Japanese, see explanation).

(Continued)

*Primary Examiner* — Tilahun Gesesse
(74) *Attorney, Agent, or Firm* — Wilson Sonsini Goodrich & Rosati

(57) ABSTRACT

Sharing media content among families of broadcast stations includes receiving information relating to media content from families of broadcast stations, storing the information such that the information is accessible to at least two of the families of broadcast stations via a computer network, receiving a query for specific media content from a broadcast station, searching the stored information in accordance with the query to identify the specific media content; and enabling the broadcast station to access to the specific media content if the specific media content is identified among the stored information.

28 Claims, 6 Drawing Sheets

U.S. PATENT DOCUMENTS

| | | | |
|---|---|---|---|
| 5,557,541 A | 9/1996 | Schulhof et al. | |
| 5,576,755 A | 11/1996 | Davis et al. | |
| 5,697,844 A | 12/1997 | Von Kohorn | |
| 5,715,018 A | 2/1998 | Fasciano et al. | |
| 5,724,521 A | 3/1998 | Dedrick | |
| 5,738,583 A | 4/1998 | Comas et al. | |
| 5,948,061 A | 9/1999 | Merriman et al. | |
| 5,999,808 A | 12/1999 | LaDue | |
| 6,011,973 A | 1/2000 | Valentine et al. | |
| 6,104,815 A | 8/2000 | Alcorn et al. | |
| 6,167,382 A | 12/2000 | Sparks et al. | |
| 6,198,906 B1 | 3/2001 | Boetje et al. | |
| 6,212,392 B1 | 4/2001 | Fitch et al. | |
| 6,256,508 B1 | 7/2001 | Nakagawa et al. | |
| 6,260,047 B1 | 7/2001 | Fox et al. | |
| 6,282,548 B1 | 8/2001 | Burner et al. | |
| 6,286,005 B1 | 9/2001 | Cannon | |
| 6,298,218 B1 | 10/2001 | Lowe et al. | |
| 6,311,214 B1 | 10/2001 | Rhoads | |
| 6,317,784 B1 | 11/2001 | Mackintosh et al. | |
| 6,338,043 B1 | 1/2002 | Miller | |
| 6,374,177 B1 | 4/2002 | Lee et al. | |
| 6,388,712 B1 | 5/2002 | Shinohara et al. | |
| 6,401,075 B1 | 6/2002 | Mason et al. | |
| 6,411,992 B1* | 6/2002 | Srinivasan et al. | 709/218 |
| 6,416,414 B1 | 7/2002 | Stadelmann | |
| 6,470,180 B1 | 10/2002 | Kotzin et al. | |
| 6,502,076 B1 | 12/2002 | Smith | |
| 6,508,710 B1 | 1/2003 | Paravia et al. | |
| 6,509,867 B1 | 1/2003 | McGibney | |
| 6,527,638 B1 | 3/2003 | Walker et al. | |
| 6,527,641 B1 | 3/2003 | Sinclair et al. | |
| 6,606,745 B2 | 8/2003 | Maggio | |
| 6,628,928 B1 | 9/2003 | Crosby et al. | |
| 6,628,939 B2 | 9/2003 | Paulsen | |
| 6,650,892 B1 | 11/2003 | Thiriet | |
| 6,674,995 B1 | 1/2004 | Meyers et al. | |
| 6,678,501 B1 | 1/2004 | Valeski | |
| 6,701,355 B1 | 3/2004 | Brandt et al. | |
| 6,711,474 B1 | 3/2004 | Treyz et al. | |
| 6,725,022 B1 | 4/2004 | Clayton et al. | |
| 6,735,435 B2 | 5/2004 | Newell et al. | |
| 6,747,706 B1* | 6/2004 | Geddes et al. | 348/722 |
| 6,767,284 B1 | 7/2004 | Koza | |
| 6,778,820 B2 | 8/2004 | Tendler | |
| 6,820,055 B2 | 11/2004 | Saindon et al. | |
| 6,820,277 B1* | 11/2004 | Eldering et al. | 725/35 |
| 6,829,475 B1 | 12/2004 | Lee et al. | |
| 6,850,839 B1 | 2/2005 | McGibney | |
| 6,895,238 B2 | 5/2005 | Newell et al. | |
| 6,915,107 B1 | 7/2005 | Lusk | |
| 6,941,324 B2 | 9/2005 | Plastina et al. | |
| 6,952,559 B2 | 10/2005 | Bates et al. | |
| 6,957,041 B2 | 10/2005 | Christensen et al. | |
| 6,961,549 B2 | 11/2005 | Mori | |
| 6,963,910 B1 | 11/2005 | Belknap et al. | |
| 6,975,835 B1 | 12/2005 | Lake et al. | |
| 6,985,882 B1 | 1/2006 | Del Sesto | |
| 7,036,136 B1 | 4/2006 | Worthy | |
| 7,039,930 B1 | 5/2006 | Goodman et al. | |
| 7,054,592 B2 | 5/2006 | Tatsumi et al. | |
| 7,069,582 B2 | 6/2006 | Philyaw et al. | |
| 7,085,732 B2 | 8/2006 | Gould | |
| 7,158,753 B2 | 1/2007 | Kagan et al. | |
| 7,167,454 B2 | 1/2007 | Caldwell et al. | |
| 7,349,663 B1 | 3/2008 | Joseph | |
| 7,801,480 B2* | 9/2010 | Becker | 455/3.06 |
| 2001/0003099 A1 | 6/2001 | Von Kohorn | |
| 2001/0018858 A1 | 9/2001 | Dwek | |
| 2001/0037304 A1 | 11/2001 | Paiz | |
| 2001/0048748 A1 | 12/2001 | Van Ryzin | |
| 2001/0051559 A1 | 12/2001 | Cohen et al. | |
| 2002/0023020 A1 | 2/2002 | Kenyon et al. | |
| 2002/0038455 A1 | 3/2002 | Srinivasan et al. | |
| 2002/0042923 A1 | 4/2002 | Asmussen et al. | |
| 2002/0049037 A1 | 4/2002 | Christensen et al. | |
| 2002/0056118 A1 | 5/2002 | Hunter et al. | |
| 2002/0059646 A1 | 5/2002 | Kim | |
| 2002/0069404 A1 | 6/2002 | Copeman et al. | |
| 2002/0092019 A1 | 7/2002 | Marcus | |
| 2002/0099600 A1 | 7/2002 | Merriman et al. | |
| 2002/0122052 A1 | 9/2002 | Reich et al. | |
| 2002/0133820 A1 | 9/2002 | Arai et al. | |
| 2002/0168967 A1 | 11/2002 | Clapper | |
| 2002/0178058 A1 | 11/2002 | Ritchie et al. | |
| 2002/0194215 A1 | 12/2002 | Cantrell et al. | |
| 2003/0003990 A1 | 1/2003 | Von Kohorn | |
| 2003/0009452 A1 | 1/2003 | O'Rourke et al. | |
| 2003/0023489 A1* | 1/2003 | McGuire et al. | 705/14 |
| 2003/0045273 A1 | 3/2003 | Pyhalammi et al. | |
| 2003/0069032 A1 | 4/2003 | Jarvi et al. | |
| 2003/0070167 A1* | 4/2003 | Holtz et al. | 725/32 |
| 2003/0093530 A1 | 5/2003 | Syed | |
| 2003/0105809 A1 | 6/2003 | Yoshii et al. | |
| 2003/0119528 A1 | 6/2003 | Pew et al. | |
| 2003/0126616 A1 | 7/2003 | Dewa | |
| 2003/0139190 A1 | 7/2003 | Steelberg et al. | |
| 2003/0229559 A1 | 12/2003 | Panttaja et al. | |
| 2004/0024633 A1 | 2/2004 | Whymark | |
| 2004/0028388 A1 | 2/2004 | Kataoka et al. | |
| 2004/0038723 A1 | 2/2004 | Schneier et al. | |
| 2004/0064524 A1 | 4/2004 | Van Steenbergen et al. | |
| 2004/0087326 A1* | 5/2004 | Dunko et al. | 455/517 |
| 2004/0093394 A1 | 5/2004 | Weber et al. | |
| 2004/0103026 A1 | 5/2004 | White | |
| 2004/0117826 A1 | 6/2004 | Karaoguz et al. | |
| 2004/0127199 A1 | 7/2004 | Kagan et al. | |
| 2004/0198217 A1 | 10/2004 | Lee et al. | |
| 2004/0215515 A1 | 10/2004 | Perry | |
| 2004/0236864 A1 | 11/2004 | Stevenson et al. | |
| 2004/0244042 A1 | 12/2004 | Billmaier | |
| 2005/0015800 A1 | 1/2005 | Holcomb | |
| 2005/0020238 A1 | 1/2005 | Eastman et al. | |
| 2005/0021396 A1 | 1/2005 | Pearch et al. | |
| 2005/0039206 A1 | 2/2005 | Opdycke et al. | |
| 2005/0043020 A1 | 2/2005 | Lipsanen et al. | |
| 2005/0065806 A1 | 3/2005 | Harik | |
| 2005/0065844 A1 | 3/2005 | Raj et al. | |
| 2005/0090279 A9 | 4/2005 | Witkowski et al. | |
| 2005/0105725 A1 | 5/2005 | Lee | |
| 2005/0137958 A1 | 6/2005 | Huber et al. | |
| 2005/0198317 A1 | 9/2005 | Byers | |
| 2005/0227678 A1 | 10/2005 | Agrawal et al. | |
| 2005/0239402 A1 | 10/2005 | Gioscia et al. | |
| 2005/0267817 A1 | 12/2005 | Barton et al. | |
| 2005/0278769 A1 | 12/2005 | Steelberg et al. | |
| 2006/0019642 A1 | 1/2006 | Steelberg et al. | |
| 2006/0133407 A1 | 6/2006 | Kuisma | |
| 2006/0143236 A1 | 6/2006 | Wu | |
| 2006/0146765 A1 | 7/2006 | Van de Sluis et al. | |
| 2006/0176374 A1 | 8/2006 | Oklejas | |
| 2006/0195863 A1 | 8/2006 | Whymark | |
| 2006/0212901 A1 | 9/2006 | Steelberg et al. | |
| 2006/0218401 A1 | 9/2006 | Jun | |
| 2006/0248209 A1 | 11/2006 | Chiu et al. | |
| 2006/0268667 A1 | 11/2006 | Jellison, Jr. et al. | |
| 2006/0282533 A1 | 12/2006 | Steelberg et al. | |
| 2006/0294571 A1 | 12/2006 | Moore et al. | |
| 2007/0022459 A1 | 1/2007 | Gaebel et al. | |
| 2007/0027958 A1 | 2/2007 | Haslam | |
| 2007/0078712 A1 | 4/2007 | Ott et al. | |
| 2007/0078714 A1 | 4/2007 | Ott et al. | |
| 2007/0094042 A1 | 4/2007 | Ramer et al. | |
| 2007/0118873 A1 | 5/2007 | Houh et al. | |
| 2007/0130012 A1 | 6/2007 | Yruski et al. | |
| 2007/0157261 A1 | 7/2007 | Steelberg et al. | |
| 2007/0245020 A1 | 10/2007 | Ott | |
| 2007/0250856 A1 | 10/2007 | Leavens et al. | |
| 2007/0259318 A1 | 11/2007 | Harrison | |
| 2008/0021771 A1 | 1/2008 | Ho | |
| 2008/0046948 A1* | 2/2008 | Verosub | 725/117 |
| 2008/0077264 A1 | 3/2008 | Irvin et al. | |
| 2008/0208378 A1 | 8/2008 | Booth et al. | |
| 2008/0249982 A1 | 10/2008 | Lakowske | |
| 2008/0253307 A1 | 10/2008 | Irvin | |
| 2008/0254741 A1 | 10/2008 | Irvin | |
| 2008/0255686 A1 | 10/2008 | Irvin et al. | |

| | | | |
|---|---|---|---|
| 2008/0256080 A1* | 10/2008 | Irvin et al. | 707/10 |
| 2008/0256109 A1 | 10/2008 | Irvin et al. | |
| 2009/0019374 A1 | 1/2009 | Logan et al. | |
| 2010/0064338 A1 | 3/2010 | Steelberg et al. | |

FOREIGN PATENT DOCUMENTS

| | | |
|---|---|---|
| JP | 03-184486 | 8/1991 |
| JP | 05-284162 | 10/1993 |
| JP | 07-505028 | 6/1995 |
| JP | 09-018430 | 1/1997 |
| JP | 2000-244427 | 9/2000 |
| JP | 2002-368704 | 12/2002 |
| KR | 10-1997-0019597 | 4/1997 |
| KR | 10-2001-0112410 | 12/2001 |
| WO | WO 97/15999 A2 | 5/1997 |
| WO | WO 97/21183 | 6/1997 |
| WO | WO 97/15999 A3 | 7/1997 |
| WO | WO 97/34384 A1 | 9/1997 |
| WO | WO 99/49663 A1 | 9/1999 |
| WO | WO 01/35667 A1 | 5/2001 |
| WO | WO 02/01869 A1 | 1/2002 |
| WO | WO 02/25467 A1 | 3/2002 |
| WO | WO 02/27425 A2 | 4/2002 |
| WO | WO 02/27425 A3 | 4/2002 |
| WO | WO 2004/017163 A2 | 2/2004 |
| WO | WO 2004/017163 A3 | 11/2004 |

OTHER PUBLICATIONS

"Eonstreams, Advertise with us!," Eonstreams, Inc., 2006, 1 page, [online] [retrieved on Apr. 28, 2006] Retrieved from the Internet: <URL: http://www.eonstreams.com/Advertisers.htm>.

"Eonstreams, advertising . . . ," Eonstreams, Inc., 2004, 1 page, [online] [retrieved on Apr. 7, 2005] Retrieved from the Internet: <URL: http://www.eonstreams.com/ServicesAdv.htm>.

"Eonstreams, be an eon!," Eonstreams, Inc., 2004, 1 page, [online] [retrieved on Apr. 7, 2005 ] Retrieved from the Internet: <URL: http://www.eonstreams.com/>.

"Eonstreams, Better together . . . ," Eonstreams, Inc., 2006, 1 page, [online] [retrieved on May 22, 2006] Retrieved from the Internet: <URL: http://www.eonstreams.com/>.

"Eonstreams, case studies . . . ," Eonstreams, Inc., 2004, 2 pages, [online] [retrieved on Apr. 7, 2005] Retrieved from the Internet: <URL: http://www.eonstreams.com/SamplesCase.htm>.

"Eonstreams, clients love us . . . ," Eonstreams, Inc., 2004, 1 page, [online] [retrieved on Apr. 7, 2005] Retrieved from the Internet: <URL: http://www.eonstreams.com/Testimonials.htm>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Inc. Secures Financing to Deploy Revolutionary Ad Insertion Capability," SOURCE Eonstreams, Inc., Mar. 29, 2005, 2 Pages, [online] [retrieved on Apr. 8, 2005] Retrieved from the Internet: <URL: http://www.prnewswire.com/cgi-bin/stories.pl?ACCT=104&STORY=/www/story/Mar. 29, 2005/0003288...>.

"Eonstreams, Kevin Woods, CTO," Eonstreams, Inc., 2004, 1 page, [online] [retrieved on Apr. 7, 2005] Retrieved from the Internet: <URL: http://www.eonstreams.com/CoInfoCTO.htm>.

"Eonstreams, pay-per-view . . . ," Eonstreams, Inc., 2004, 1 page, [online] [retrieved on Apr. 7, 2005] Retrieved from the Internet: <URL: http://www.eonstreams.com/ServicesPPV.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Steve Newman, CEO," Eonstreams, Inc., 2004, 1 page, [online] [retrieved on Apr. 7, 2005] Retrieved from the Internet: <URL: http://www.eonstreams.com/CoInfoCEO.htm>.

"Eonstreams, streaming . . . ," Eonstreams, Inc., 2004, 1 page, [online] [retrieved on Apr. 7, 2005] Retrieved from the Internet: <URL: http://www.eonstreams.com/ServicesStreaming.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, subscription . . . ," Eonstreams, Inc., 2004, 1 page, [online] [retrieved on Apr. 7, 2005] Retrieved from the Internet: <URL: http://www.eonstreams.com/ServicesSub.htm>.

"Eonstreams, Susan Seagraves, CFO," Eonstreams, Inc., 2004, 1 page, [online] [retrieved on Apr. 7, 2005] Retrieved from the Internet: <URL: http://www.eonstreams.com/CoInfoCFO.htm>.

"Eonstreams, testimonials, 650WSM Nashville's Country Legend!, WSM | Citadel Broadcasting Corporation," Eonstreams, Inc., 2004, 1 page, [online] [retrieved on Apr. 7, 2005] Retrieved from the Internet: <URL: http://www.eonstreams.com/TestimonialsWSM.htm>.

"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL: http://www.eonstreams.com/TestimonialsCitadel.htm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, total solutions . . . ," Eonstreams, Inc., 2004, 1 page, [online] [retrieved on Apr. 7, 2005] Retrieved from the Internet: <URL: http://wwvv.eonstreams.com/Services.htm>.

"Eonstreams, what we do . . . ," Eonstreams, Inc., 2004, 1 page, [online] [retrieved on Apr. 7, 2005] Retrieved from the Internet: <URL: http://www.eonstreams.com/Samples.htm>.

"Eonstreams, Who we are . . . ," Eonstreams, Inc., 2006, 1 page, [online] [retrieved on Apr. 28, 2006] Retrieved from the Internet: <URL: http://www.eonstreams.com/About_Us.htm>.

"Eonstreams, WIVK Knoxville, TN . . . ," Eonstreams, Inc., 2004, 1 page, [online] [retrieved on Apr. 7, 2005] Retrieved from the Internet: <URL: http://www.eonstreams.com/SamplesDemosWIVK.htm>.

"Eonstreams, Z100, NY . . . ," Eonstreams, Inc., 2004, 1 page, [online] [retrieved on Apr. 7, 2005] Retrieved from the Internet: <URL: http://www.eonstreams.com/SamplesDemosZ100.htm>.

"MediaSpan Online Services Partners With Eonstreams," EContentMag.com, Feb. 3, 2006, 3 pages, [online] [retrieved on Apr. 28, 2006] Retrieved from the Internet: <URL: http://www.econtentmag.com/Articles/ArticleReader.aspx?ArticleID=15031>.

"NAB2005—The World's Largest Electronic Media Show," National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

"Streaming Audio and Video Development and Media Hosting Solutions," VitalStream, Inc., 2000-2006, 1 page, [online] [retrieved on May 22, 2006] Retrieved from the Internet: <URL: http://www.vitalstream.com/about/index.html.>.

"VitalStream Acquires Eonstreams to Provide Comprehensive Online Advertising Solutions" VitalStream, Press Release, May 22, 2006, 3 pages, [online] [retrieved on May 22, 2006] Retrieve from the Internet: <URL: www.vitalstream.com/news/release-May 22, 2006.html>.

DSP-32C Brochure, Ariel Corporation, 433 River Road, Highland Park, NJ 08904, (201) 249-2900, May 1, 1989.

16-Bit Stereo Brochure, Spectrum Signal Processing, Inc. Date unknown.

Dsp-32C Brochure, Ariel Corporation, 433 River Road, Highland Park, Nj 08904, (201) 249-2900, May 1, 1989.

DSP56001 Brochure, Spectrum Signal Processing, Inc., (508) 366-7355. Date unknown.

European Patent Office: Supplementary European Search Report for International Application No. PCT/US2005/016405 (6 pages). Munich, Germany. Sep. 18, 2008.

International Search Report and the Written Opinioin of the International Searching Authority, or the Declaration; PCT/US2006/047944, dated Nov. 6, 2008.

International Search Report and the Written Opinion of the Int'l Searching Authority, or the Declaration. Int'l application No. PCT/US 06/47944, form PCT/ISA/220 dated Apr. 24, 2008.

International Search Report and Written Opinion, PCT International Patent Application No. PCT/US06/09797 dated Aug. 23, 2007.

International Search Report and Written Opinion, PCT US06-09349 dated Jun. 9, 2008.

International Search Report and Written Opinion, PCT/US06/09401 dated Sep. 22, 2006.

International Search Report and Written Opinion, PCT/US06/19096 dated Apr. 30, 2007, 7 pages.

International Search Report and Written Opinion, PCT/US06/28483 dated Jul. 18, 2007.

International search report dated Feb. 24, 2009 for PCT Application No. US2008/60169.

International search report dated Sep. 16, 2008 for PCT Application No. US2008/60088.

International search report dated Feb. 18, 2009 for PCT Application No. US2008/60175.

International Search Report, dated Feb. 12, 2008 for PCT/US2007/079088.

International Search Report, PCT/US02/04769 dated Jul. 23, 2002.

International Search Report, PCT/US02/19983 dated Oct. 18, 2002.

International search reported dated Sep. 26, 2008 for PCT Application No. US2008/60024.

International Searching Authority Written Opinion, dated Feb. 12, 2008 for PCT/US2007/079088.

Kumar, Shreyas, Patent Examination for Australian Patent Application No. 2006227730, in Examination Report mailed May 22, 2009.

MM-96 Brochure, Ariel Corporation, 1990.

Oki Real Voice Products Brochure, Oki Semiconductors. Date unknown.

SX-10 Brochure, Antex Electronics, Mar. 1989.

VP600 Brochure, Antex Electronics, 16100 Figueroa St, Gardena, CA 90248 (213) 532-3092. Date unknown.

VP620E Brochure, Antex Electronics. 16100 Figueroa St, Gardena, CA 90248 (213) 532-3092. Date unknown.

VP625 Brochure, Antex Electronics, 16100 Figueroa St, Gardena, CA 90248 (213) 532-3092. Date unknown.

VP635 Brochure, 16100 Figueroa St, Gardena, CA 90248 (213) 532-3092. Date unknown.

Windows XP Media Center Edition 2004 Review. Available at http://www.winsupersite.com/reviews/windowsxp_mce2004.asp Sep. 30, 2003. Accessed Jan. 12, 2009.

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-wwvv8.html>.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter.com/press/releases/pr_adman10.htm> Sep. 9, 1996.

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

AdKnowledge Corporate Information, Company Overview, [online retrieved Aug. 16, 2007] Retrieved from <URL:http://web.archive.org/web/19990128143110/www.adknowledge.com/corporate/index.html>.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

Adwiz by NEC, "The Artificial Intelligence Solution for Advertisement Targeting," [Online], [retrieved Apr. 1, 2008] Retrieved from the Internet: <URL:http://web.archive.org/web/20000816042946/http://www.ccrl.com/adwiz/>.

AdKnowledge, Inc., Campaign Manager, "Streamlines buying and trafficking while saving time and money," [Online], [retrieved Aug. 16, 2007] Retrieved from the internet: <URL:http://web.archive.org/web/19990221080152/www.adknowledge.com/aksystem/campaign.html>.

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.

Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.

Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/b-publish>.

Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.

Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz.com/pages/b-adspacesplaces>.

Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.

Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.

Information Access Technologies, Inc., "Aaddzz Selling Ad Space With Aaddzz," [Online], [retrieved Apr. 15, 2008] Retrieved from the Internet: <URL:http://web.archive.org/web/19980130092829/wwvv.aaddzz.com/pages/selling>.

Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.

Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.

Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.

Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.

Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced>.

Information Access Technologies, Inc., "Aaddzz Frequently Asked Questions," [Online], [retrieved Apr. 15, 2008] Retrieved from the Internet: <URL:http://web.archive.org/web/19980130092914/wvvw.aaddzz.com/pages/faq>.

Information Access Technologies, Inc., "Aaddzz Home Page," [Online], [retrieved Apr. 15, 2008] Retrieved from the Internet: <URL:http://www.aaddzz.com/letter.html>.

NEC Corporation, NEC: Press Release "NEC announces Adwiz, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html >.

AdKnowledge Inc., "Automates the targeting and serving of web advertising campaigns," [Online], [retrieved on Aug. 16, 2007] Retrieved from the Internet: <URL:http://web.archive.org/web/19990222023416/www.adknowledge.com/aksystem/smartbanner.html>.

IEEE Intelligent Systems, New Products, "Tell your computer where to go," United Kingdom, Jan./Feb. 1998.

AdKnowledge Inc., "The AdKnowledge System," [Online], [retrieved on Aug. 16, 2007] Retrieved from the Internet: <URL:http://web.archive.org/web/19990221115917/www.adknowledge.com/aksystem/index.html>.

AdKnowledge Inc., Corporate Information "AdKnowledge Events," [Online], [retrieved on Aug. 16, 2007] Retrieved from the Internet: <URL:http://web.archive.org/web/20000511005235/www.adknowledge.com/whatsnew/events.html >.

NEC Corporation, Adwiz White Paper, "Taking Online Ad Targeting to the Next Level," [Online], [retrieved on Apr. 15, 2008] Retrieved from the Internet: <URL:http://web.archive.org/web/20010619222015/www.ccrl.com/adwiz/whitepaper.html>.

ScanScout, "ScanScout in the News," [Online], [retrieved Apr. 16, 2008]. Retrieved from the Internet: <URL:http://scanscout.com/>.

Blinkx, "Video Search Engine—Blinkx," [Online], [retrieved Apr. 16, 2008]. Retrieved from the Internet: <URL:http://blinkx.comt>.

EveryZing, Inc., "Video SEO and Multimedia Search Solutions," [Online], [retrieved Apr. 16, 2008], Retrieved from the Internet: <URL:http://everyzing.com>.

Inside Online Video, "Blinkx to Contextualize Video Ads Through Speech Recognition," Jun. 22, 2007 [Online], [retrieved Apr. 16, 2008] Retrieved from the Internet: <URL:http://www.insideonlinevideo.com/20007/06/22/blinkx-to-contextualize-video-ads-through-speech-recognition/>.

International Search Report & Written Opinion in Application No. PCT/US2008/059898, dated Aug. 14, 2008.

NEC Corporation, "ADWIZ Intelligent Advertisement Targeting," from www.Archive.org, archived on Dec. 12, 1998 at http://web.archive.org/web/20020418173231/www.ccrl.com/adwiz/factsheet.html.

Zeff, et al. "Advertising on the Internet" second edition, pp. 1-436 (Aug. 2, 1999).

European search report dated May 27, 2010 for Application No. 2742282.3.

* cited by examiner

SHARING MEDIA CONTENT AMONG FAMILIES OF BROADCAST STATIONS

TECHNICAL FIELD

This patent application describes sharing media content among families of broadcast stations.

BACKGROUND

Different radio stations have access to different content.

SUMMARY

Some radio stations are part of groups of affiliated stations, referred to as families. A family may include radio stations in the same physical vicinity; e.g., within the same city or town. Radio stations in a family may have access to media content of other radio stations in the family. Media content may include, but is not limited to, any type of broadcast content, such as individual songs, playlists, talk radio programming, text, images, and advertising.

This patent application describes sharing media content among families of broadcast stations. For example, according to the implementations described herein, a radio station in one family may search for, and retrieve, media content, such as songs and advertisements, maintained by another radio station family.

In general, this patent application describes sharing media content among families of broadcast stations. A method for sharing media content comprises receiving information relating to media content from families of broadcast stations, storing the information such that the information is accessible to at least two of the families of broadcast stations via a computer network, and receiving a query for specific media content from a broadcast station that is a member of a first family of broadcast stations. The specific media content may be associated with a second family of broadcast stations that is different from the first family. The method also comprises searching the stored information in accordance with the query to identify the specific media content, and enabling the broadcast station to access the specific media content if the specific media content is identified among the stored information. The method may also include one or more of the following features, either alone or in combination.

The information may identify media content by family of broadcast station and by one or more attributes of the media content. The one or more attributes may comprise at least one of a title associated with the media content an artist associated with the media content, notes associated with the media content, a composer associated with the media content, a producer associated with the media content, a category associated with the media content, a type number associated with the media content, an advertiser number associated with the media content, and user-defined eastern information.

The method may comprise generating a graphical user interface (GUI) comprising one or more fields. The query may correspond to information contained in the one or more fields of the GUI. The GUI may comprise one or more options for accessing the specific media content. Enabling the broadcast station to access the specific media content may comprise receiving a selection corresponding to the one or more options, and instructing a broadcast station that stores the specific media content to provide the specific media content to the broadcast station that issued the query. The one or more options may comprise an option to obtain the specific media content immediately, and an option to obtain the media content at a predefined time. The media content may comprise music from a family of broadcast stations or any other media asset. The media content may be stored in one or more repositories that are communicatively coupled to the network.

The broadcast stations may be radio stations. The method may be performed at one or more computer systems that are separate from the families of broadcast stations.

In general, this patent application also describes a method of sharing media content among families of broadcast stations, which comprises receiving information relating to media content for families of broadcast stations, storing the information such that the information is accessible to at least one of the families of broadcast stations via a computer network, and receiving a query for specific media content from a broadcast station that is a member of a first family of broadcast stations. The specific media content may be associated with a second family of broadcast stations that is different from the first family. The method may also comprise searching the information in accordance with the query to identify a location of the specific media content, obtaining the specific media content from the location, and providing the specific media content to the broadcast station. The method may also include one or more of the following features, either alone or in combination.

The method may comprise generating a GUI comprising one or more fields. The query may correspond to information contained in the one or more fields of the GUI. The method may be performed at a central server and the location of the specific media content may comprise one or more servers that are remote from the central server. The one or more servers may be communicatively coupled to the central server via one or more computer networks. The method may be performed at one or more computer systems that is a member of the second family. The broadcast stations may be radio stations. The method may also include receiving other media content from another broadcast station among the families of broadcast stations, and screening the other media content in accordance with one or more predefined rules and/or changing metadata associated with the other media content.

The general and specific aspects can be implemented using a system, method, or a computer program, or any combination of systems, methods, computing devices, and computer programs. The details of one or more implementations are set forth in the accompanying drawings and the description below. Other features, aspects, and advantages will be apparent from the description, the drawings, and the claims.

DESCRIPTION OF DRAWINGS

Like reference symbols in the various drawings indicate like elements.

DETAILED DESCRIPTION

Figure 1:
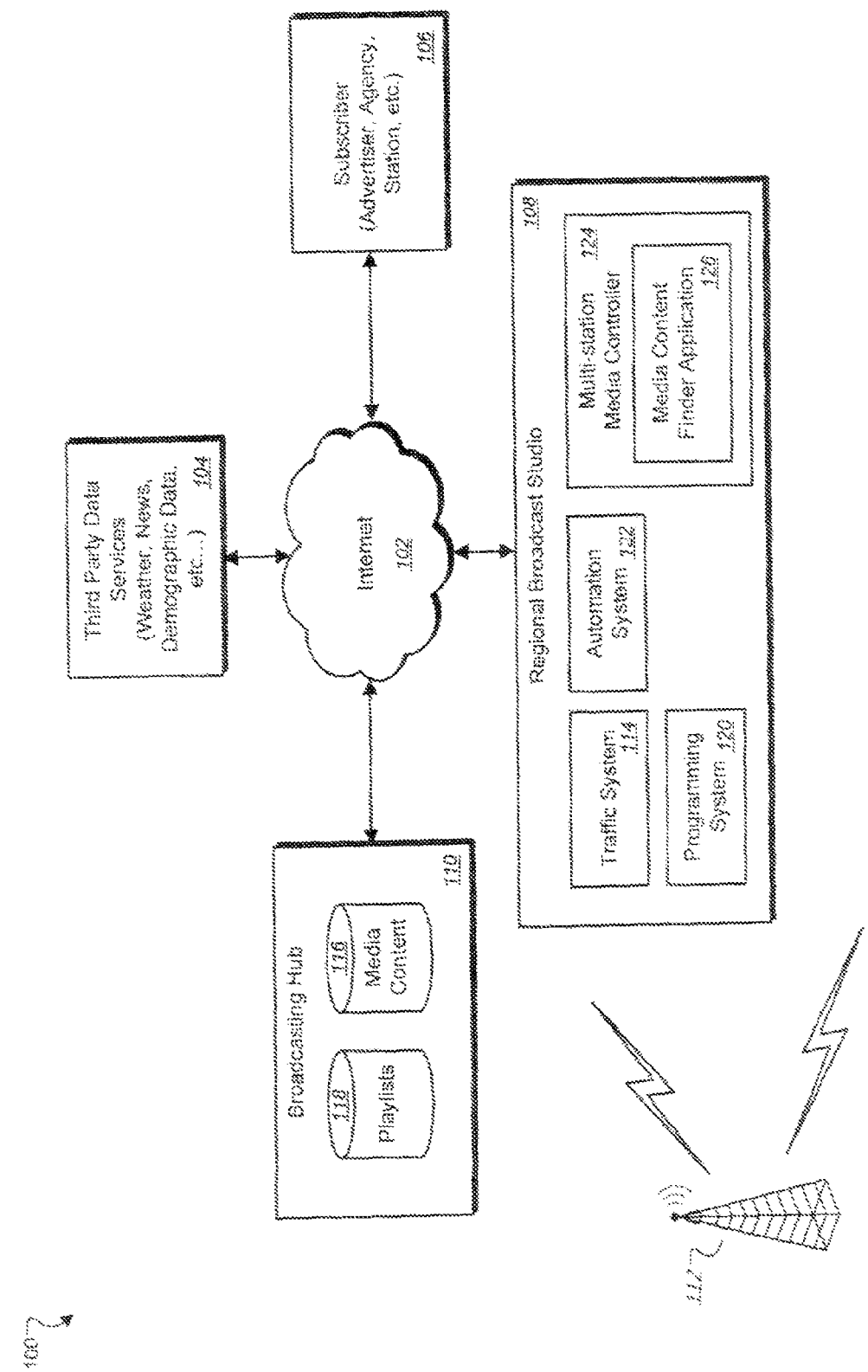
FIG. 1 illustrates an architecture of a communication system used to broadcast audio content.

FIG. 1 illustrates an example architecture of a communication system 100 used to broadcast audio content. By way of example, audio broadcasting systems and methods are discussed below. The methods, processes, engines, apparatus, computer program products, systems and the like discussed below are equally applicable to other communication environments including any type of broadcast station, broadcast television (TV), cable television, satellite TV, Internet communication systems (including Internet radio and Internet TV), and other communication environments.

Audio content (e.g., music and advertising) may be inventoried and categorized for the communication system 100 in several ways (e.g., by keyword, price, vendor, last played, etc.). Several radio stations can use the communication system 100 and may wish to have access to inventoried media content to schedule music, advertisement, and/or any other type of media asset on their stations. In some implementations, radio stations may use the communication system 100 to share media content. For example, a program director at one radio station may search for and download a song or an advertisement (ad) stored at another radio station. In other implementations, the radio stations, the broadcasting hub, or a combination of the two may use the media content inventory information and other data to un-schedule current programming, and reschedule new programming that may be more suitable (e.g., suitable in terms of content, price, or other criteria) in a particular time slot. For example, a radio station may receive a last minute ad at a higher price (e.g., cost per thousand (CPM)) than other previously received advertisements, and can "bump" (or pre-empt) a currently scheduled advertisement in favor of the higher priced advertisement. In another example, a radio station may receive a new popular song that is deemed worthy of interrupting current programming for immediate play. In some implementations, communication system 100 may allow radio stations to share audio clips of historical significance, such as a press conference describing a new invention that promises to change the world.

As shown in FIG. 1, the communication system 100 includes a network 102 to communicatively couple third-party data sources 104, at least one subscriber 106, at least one regional broadcast studio 108 (e.g., radio station), and a broadcasting hub 110. In a radio broadcast implementation, at least one regional broadcast studio 108 may be further communicatively coupled to at least one radio transmitter 112. In this example, the network 102 includes the Internet. In other implementations, the network 102 can be any network, such as a LAN, a MAN, a WAN, a wired or wireless network, a private network, or a virtual private network (VPN).

The network 102 is shown communicatively coupled to third-party data sources 104. Third-party data sources 104 can include any database, data mart, or other data source that provides data of interest to the subscriber 106, the hub 110, or the regional broadcast studio 108 that may be relevant to the content and scheduling of music and advertisements. For example, third-party data may include Arbitron ratings and demographic breakdowns for each station in a broadcast network. Such data may be of use to a subscriber 106 in deciding what amount that the subscriber would be willing to pay to run an advertisement campaign on a given station. In another example, third-party data may indicate the categories of music that are likely to attract listeners in particular areas. Third-party data may categorize music by type (e.g., rock, classical, jazz) and language (e.g., English, Spanish, French). In addition, third-party data may include the weather forecast, current weather conditions, or news events such as stock prices, sports scores, data from a syndicated data feed such as an RSS feed, or any other data relevant to a party's desire to play music or an advertisement. In one implementation, information or data is received or collected directly by the broadcasting hub 110 rather than from third-party sources 104. Regardless of the source, the broadcasting hub 110 can use the information in evaluating whether criteria are met for playing music or an advertisement.

The subscriber 106 is also communicatively coupled to the broadcasting hub 110. This allows the subscriber 106 to purchase, schedule, and upload music and advertising spots using, e.g., a graphical user interface (GUI), of the broadcasting hub 110. Subscriber 106 may access hub 110 via a connection to the network 102. The connection to network 102 may be any connection that allows access to hub 110. For example, subscriber 106 may access hub 110 using TCP/IP and a dial-up connection over a modem, or a dedicated connection that provides constant access. The broadcasting hub 110 may have a unique HyperText Transfer Protocol (HTTP) address, a unique File Transfer Protocol (FTP) address, or any other addressing scheme that allows subscriber 106 to identify hub 110. Subscribers 106 can include music warehouses, advertisers, agencies, stations, or any other entity that interacts with the broadcasting hub 110. In some implementations, subscribers 106 have an account with the broadcasting hub 110 and are charged a fee for use of the broadcasting hub 110. In other implementations, subscribers 106 can access the broadcasting hub 110 free of charge.

As shown in FIG. 1, a regional broadcast studio 108 can include a traffic system 114. The traffic system 114 may schedule radio advertisements based on an advertiser request. For example, the traffic system 114 may receive a request to schedule the play of a particular advertisement in three assigned time slots each day during the weekdays of Monday through Friday. The traffic system 114 can store the advertisements as media content 116. The traffic system 114 can store the schedules and/or instructions for playing the advertisements as playlists 118. In some implementations, the media content 116 and the playlists 118 can be stored at regional broadcast studio 108.

The regional broadcast studio 108 can also include a programming system 120 that produces and describes the overall broadcast content on a radio station. The programming system 120 can be monitored automatically via a network, such as network 102, and may fee communicatively coupled to the traffic system 114. For example, a program director at a radio station can use the programming system 120 to access media content 116 and playlists 118.

The regional broadcast studio 108 can also include an automation system 122. The automation system 122 enables automatic handling (e.g., producing, storing, sending, receiving) of media content 116 and playlists 118. In one implementation, the automation system 122 can be distributed to include a local portion that is associated with a regional broadcast studio 108 and a remote portion that is associated with broadcasting hub 110. The automation system 122 may be communicatively coupled to the traffic system 114 and the programming system 120.

The regional broadcast studio 108 can also include a multi-station media controller 124. The regional broadcast studio 108 may use the controller 124 to share media content between one or more other radio stations. The multi-station media controller 124 may be communicatively coupled to systems 114, 120 and 122. The multi-station media controller 124 can include a media content finder application 126. The application 126 can allow a user (e.g., a program director) to search for and download media content 116 that may be stored remotely, such as at another radio station.

The regional broadcast studio 108 is communicatively coupled to the broadcasting hub 110, such that the broadcasting hub 110 is capable of forwarding audio advertisements and musical (or other) content to the regional broadcast studio 108 for play. Thus, the subscriber 106 is capable of submitting media content 116 to the broadcasting hub 110. The media content 116 can include music and advertisements for play along with specific criteria for the play of that music and/or advertisement, and the broadcasting hub 110 can forward the media content to a regional broadcast studio 108 for play as appropriate. In some implementations, the playlists 118 and media content 116 can be stored locally at the regional broadcast station 108.

A broadcasting company may own several radio stations throughout the world, such as in multiple cities throughout North America and other continents. The broadcasting company may want to share media content (or media assets) among these radio stations even though the stations are geographically distributed. For instance, while some radio stations may be in the same city (and perhaps the same building), sharing media content between two remote radio stations (e.g., in different cities) may be desired.

For example, the broadcasting company may own and/or operate four radio stations in Los Angeles (LA), three in Miami, five in Chicago, two in Toronto, and several more worldwide. If the broadcasting company's Los Angeles radio stations are housed in the same building, they may be considered part of the same media "family." Radio stations in the same family can share resources, such as common information technology (IT) infrastructures and IT support staff. The radio stations in the same family can be connected to each other (and to the data they share) via a LAN, WAN or other network. Generally speaking, a radio station family may include, but is not limited to, stations within a same market, within a same city, or within a same physical space (e.g., building). Accordingly, one type of radio station family includes radio stations that are within a predefined geographic area or areas.

In one example, four downtown Los Angeles radio stations in one family may share databases, hardware and/or software systems for managing their radio content. Such radio content can include, for example, media content (e.g., audio files), programming schedules, advertisements, search catalogs, and push content (described below). The search catalogs can be associated with searching the family's local media content as well as media content of remote families owned and/or operated by the same broadcasting company. The push content can be associated with media content that one radio station family may transmit (e.g., by pre-defined business scenarios) to the broadcasting company's other radio families. Searching and sharing content can occur, for example, among radio families that have established a "friendship", such as families owned and/or operated by the same broadcasting company that may desire to share media content (e.g., music and ads).

Consider a program director at a Los Angeles radio station who may be interested in finding and airing a song written or performed by a particular artist. Using a computer software user interface such as media content finder application 126, the program director may type in the name of the artist or group (e.g., "Chip Davis" or "Mannheim Steamroller") and initiate the search. Initially, the system may search media content (e.g., database of songs) of the local Los Angeles radio station family to which the radio station belongs. The particular databases or repositories searched can include the media content of the radio stations within the family (e.g., those sharing common storage facilities in the same building). However, if the song cannot be located locally, the program director may widen the search to include radio families within the same radio station family friendship. Specifically, the search can be executed against the media content of Miami, Chicago, Toronto and other locations that are part of the same radio station family friendship. In particular, searching the databases or repositories of the other families in the friendship may occur automatically, or the widened search may be triggered explicitly by the program director.

If the requested media asset (e.g., an audio file or a specific musical piece) is located at a remote radio station family, the program director may elect to download the file. For example, downloading the file may include an initial step of verifying that the program director and/or the associated radio station family has the appropriate "rights" to download the file. Verification can include, for example, authorization of the requesting radio station family (e.g., is the family included in the friendship?) and specific musical piece-related access, such as rights based on copyright or royalty agreements. If rights to the particular media asset are verified, downloading can occur, such as via the Internet.

Figure 2:
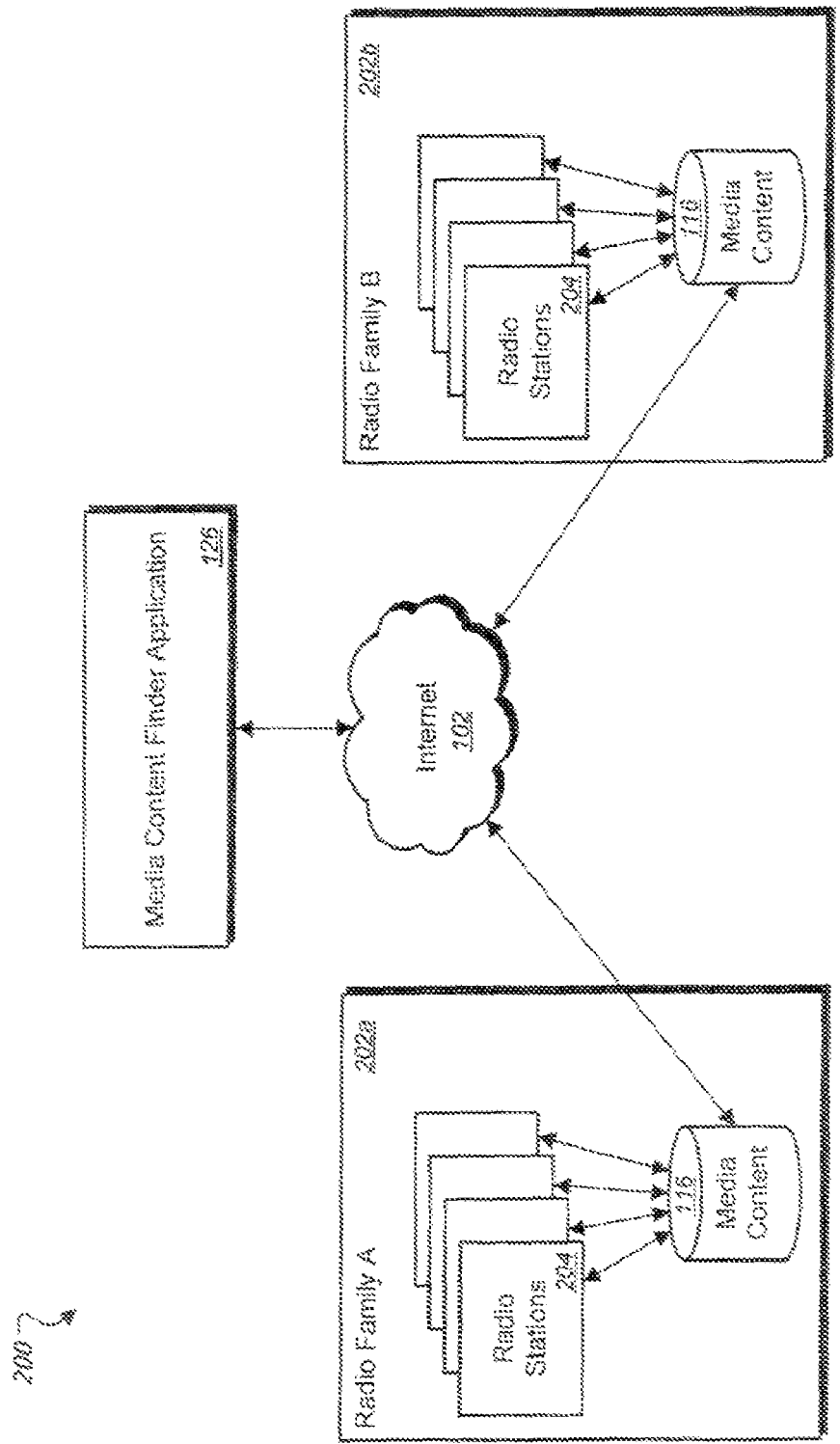
FIG. 2 is an exemplary illustration of a system for sharing media content within radio families.

FIG. 2 is an exemplary illustration of a system 200 for sharing media content within radio families and between radio station families. The implementation depicted in system 200 includes radio station family A 202a and radio station family B 202b. In one implementation, each of the radio families 202a and 202b can include one or more radio stations 204 housed in the same building or complex of buildings, such as buildings in Los Angeles and Chicago housing separate radio families in each city. There may be multiple radio families in a particular city, each housed in a different part of the city. The radio families 202a and 202b can be owned, for example, by the same broadcasting company. In some implementations, the system 200 can be used for sharing media content among radio stations and/or radio families owned by different broadcasting companies, such as through reciprocal or paid arrangements for sharing media content.

As shown in FIG. 2, radio station family A 202a and radio station family B 202b are shown communicatively coupled via the network 102 to the media content finder application 126. The application 126 can allow radio families 202a and 202b to share media content 116 with each other. For example, if radio station family A 202a is located in Los Angeles, the media content 116 stored and used by radio stations 204 in family 202a can be shared with radio station family B 202b (e.g., in Chicago). At the same time, media content 116 stored and used by radio stations 204 in radio station family B 202b (e.g., in Chicago) can be shared with radio station family A 202a in Los Angeles. The media content finder application 126 can also allow radio families 202a and 202b to share media content 116 with other radio families not depicted in FIG. 2, such as radio families in Miami and Toronto. In some implementations, some or all of the media content 116 used by the radio families 202a and 202b can be stored remotely, such as at a central media content repository (e.g., a broadcasting hub) or clearinghouse accessible via the network 102. In such ease, the media content finder application 126 can be used to locate media assets stored remotely, such as in one or more remote locations worldwide (e.g., another radio station family).

In some implementations, the media content finder application 126 can be hosted on a radio station family's computer system, such as on the hardware within the common computer network shared by radio stations in the same building. In some implementations, the content is stored on a computer of a radio station within a family. In both of these cases, the "intelligence" used by the application 126 to share media content can reside entirely on the radio station family's computer system. Other families in the friendship can have similar software on their computer systems. In this way, a radio station family in the friendship can have local software that facilitates searching and sharing of media content with other families in the friendship. For example, the Los Angeles and Chicago radio families can search and share media content, such as a Chicago-stored song requested by the Los Angeles radio station family.

In other implementations, the software used for sharing media content among radio families can be hosted on a centralized system, such as at a server accessible via the Internet or at the broadcasting hub. A radio station family may, for example, simply connect to the Internet and register as a member of a family friendship. Other families within the same friendship can register in a similar way. Whenever media content are to be searched and/or shared among radio families in a friendship, the request and processing can be handled entirely by the centralized system. Having the media asset sharing software entirely hosted on the Internet can eliminate the need for computer infrastructure (e.g., hardware, IT support staff etc.) at the radio station family.

In further implementations, software for sharing media content among radio station families can be hosted partly on the family's computer network and partly in a central system. In this way, sharing media content can, for example, exploit efficiencies that may derive from family-to-family sharing without using a central system. Specifically, such a system may still use centralized processing for some sharing functions and family-to-family processing for other sharing functions, depending on, for example, predicted transfer speeds.

In some implementations, different types of family friendships may exist among a broadcast company's radio families. For example, the system may be configured to represent families having one or more classical music stations as sharing a "classical" friendship. Similarly, radio stations that normally air Spanish language music maybe members of a "Spanish" family friendship. Different friendships can be named explicitly for easy reference by station personnel, or they may be represented implicitly, for example, by the data that defines the families.

Figure 3:
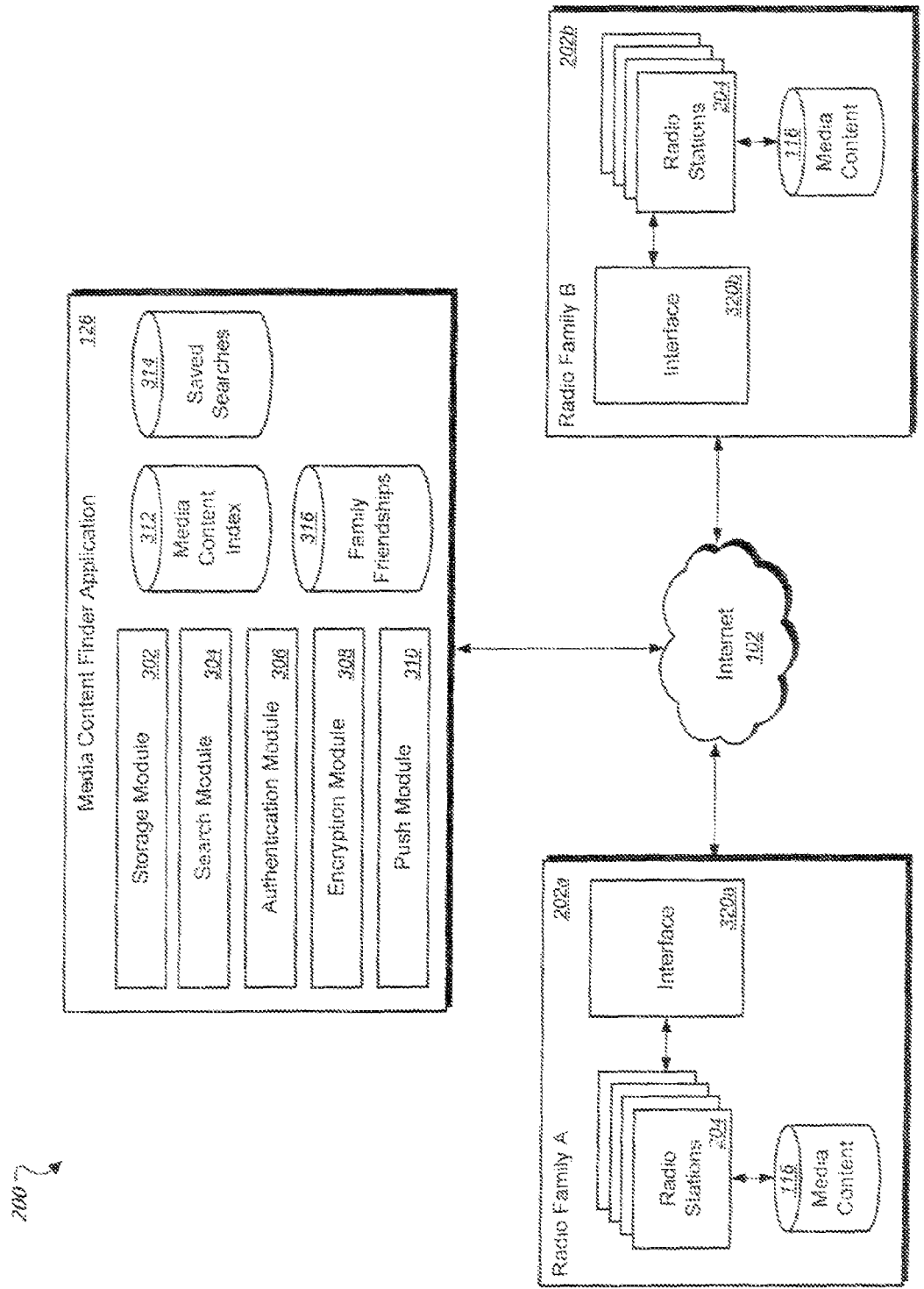
FIG. 3 is a more detailed illustration of the system of FIG. 2.

FIG. 3 is an exemplary implementation of the system 200 of FIG. 2. FIG. 3 provides detail for the media content finder application 126. As depicted, the media content finder application 126 includes (or uses) a storage software module 302, a search software module 304, an authentication software module 306, an encryption software module 308, a push software module 310, a media content index file 312, a saved searches file 314, and a family friendships file 316. It is noted that the functionality provided by these elements need not be separated as shown (e.g., by software module), but rather maybe implemented using any software and/or hardware architecture. The elements 302-316 included in (or used by) the application 126 can be communicatively coupled, such as by a network (e.g., LAN or WAN) located at the central location that houses the application 126. In some implementations, the application 126 may be distributed, executing at more than one location, such as to manage media content on a "hubbed" basis. In other implementations, portions of the computer software of software modules 302-310 may be housed within the computer systems of the radio families 202a and 202b. The software modules 302-310 may be entirely resident within the application 126, or they may invoke commercial software or services available over the network 102 or at any other location.

The storage software module 302 can receive and store information (e.g., metadata) about media content that is stored at the radio families. For example, when a radio station 204 in radio station family A 202a stores music or advertisements as media content 116, the family 202a can transmit corresponding metadata to the media content finder application 126. When the media content is a piece of music, the metadata may include the name of the song, the artist's name, the type of music (e.g., rock, classical, jazz), the song's length, the language in which the song is recorded, the radio station family that stores the media content, the date of recording, the date that the media is stored at the radio station, and or other notes. Other metadata may identify a composer, a producer, a category, a type number, an advertiser number, and other user-defined custom metadata. When the media content is an advertisement, the metadata may include the name of the advertiser, the length of the ad, the date the ad was created or received, and the scheduled broadcast times for the ad. Indexes based on the metadata for music and ads can be stored in the media content index file 312. Such an index file 312 can allow radio stations 204 to search for media content stored at other radio families. For example, terms in a search query can be used as potential matches against fields in the metadata upon which the index file 312 is based.

In some implementations, the storage software module 302 can store actual media content 116. For example, some radio families may not store all of their media content locally. Specifically, media content that is likely to be needed by several radio families in a radio friendship can be stored at a central location.

The search software module 304 can receive a search query and identify media content matching the query or that matches the query to a predefined degree. In particular, when the application 126 receives a search query from a radio station 204 for specific media content, the search software module 304 can identify the media family that stores the data. For example, a radio station 204 at the radio station family A 202a may submit a query for a specific piece of music. The query may be entered in an interface 320a (e.g., including one or more GUI screens) and transmitted to the application 126 via the network 102. The search software module 304 can use terms in the search query to access the media content index 312. Matching entries in the index 312 can be used to formulate a result set that is transmitted to the radio station 204 via the network 102. The result set can identify the locations (e.g., specific radio families) in which the media content 116 is stored. In some implementations, the result set can automatically include the media content requested in the query. In particular, users of application 126 may fee able to configure the search software module 304 to send a link to the media content, to automatically send the media content itself, depending on various pre-defined parameters, or to instruct the user to issue a specific request to download the media content. In some implementations, the user may request to download the media content immediately or at a predefined time in the future.

In some implementations, the search software module 304 can employ saved searches 314. User queries may be stored in the saved searches file 314 over time as queries are received from radio stations 204. A list of saved searches may be provided to a user (e,g., a program director) at a radio station in drop-down lists displayable in interfaces 320a or 320b, such as in GUI screens. In some implementations, the saved searches file 314 can be stored at the radio families. For example, radio station family B 202b can have local saved searches 314 for media content search queries it has issued over time.

In some implementations, saved searches 314 can include templates that a user (e.g., a program director) can quickly customize to build a query. Specifically, a template may allow the user to complete (and save) a query simply by filling in a few parameters, such as the name of a musician or song title.

For example, a template for finding a specific new (e.g., less than a month old) song at any Spanish language radio station may be completed by the user simply by filling in the song title (e.g., without having to specify date ranges or languages).

In some implementations, the search software module 304 can be used to crawl media content 116 stored at radio stations 204 in one or more radio station families. Crawling the media content can be used to pre-populate the media content index file 312 if, for example, the media content finder application 126 is installed after media content 116 already exists at radio families. Crawling can also be used to verity the index file 312 or to reconstruct the index file 312 (e.g., for disaster recovery).

The authentication software module 306 can allow the application 126 to ensure that it is communicating with radio families within radio stations under its control. For example, when a radio station 204 in radio station family A 202a sends a query to the application 126, the authentication software module 306 can authenticate the request. For instance, the authentication software module 306 can compare information about the query's originator with information in a family friendships file 316. The family friendships file 316 can provide detailed information about the radio families and their associated radio stations, including radio station family identifiers that can be used for authentication. In some implementations, the family friendships file 316 can also include information that specifies protocols between the radio families, such as specific hours of operation or preferred times for sending or receiving media content.

The encryption software module 308 can provide security for exchanging media content among radio stations. For example, using shared encryption, media content 116 shared by radio station family A 202a can be encrypted before it is transmitted across the network 102. In some implementations, some of the functionality of the encryption software module 308 can reside at the radio station families. For example, radio station families 202a and 202b can each have an encryption software module 308 for encrypting media content they transmit, and for decrypting media content they receive.

The push software module 310 can automatically send specific media content to radio stations. For example, one of the radio station families may have a radio station 204 that has facilities (e.g., translators and recording studios) for creating Spanish language versions of popular songs. In particular, a broadcasting company with several radio station families may have a procedure in place for creating the Spanish versions of songs at a single radio station, then "pushing" the media content to other radio stations.

In one example sequence of pushing media content, a radio station 204 in radio station family A 202a creates the Spanish version of a particular song. After the song is stored locally in media content 116, the radio station family A 202a also transmits metadata corresponding to the Spanish song to the application 126. Upon receipt of the metadata, the storage software module 302 updates the media content index file 312. At the same time, the storage software module 302 accesses the family friendships file 316 and determines that the media content it just received can be automatically pushed to other Spanish language radio stations. The application 126 then invokes the push software module 310 to push the Spanish song to other radio families, such as to radio station family B 202b if it has one or more Spanish radio stations 204.

In some implementations, pushed media content can be reviewed by a radio station family before it is stored locally. For example, radio station family A 202a may use the interlace 320a to screen media content pushed to it from other radio families, such as from radio station family B 202b. Similarly radio station family B 202b may use the interface 320b to screen media content pushed to it from radio station family A 202a. In some implementations, pushed media content awaiting screening can be held by the application 126 (e.g., at the Internet site hosting the application 126). In other implementations, pushed media content awaiting screening can be stored at the radio families until it is screened.

In some implementations, a user in one family may use a different user interface (e.g., other than media content search screens) to initiate a transfer (e.g., push) of a specified media asset from one family to another. For example, a user at radio station family A 202a may identify a piece of music that the user believes radio station family B 202b may want. Using the interface, such as an interface that displays new media content processed for the day, the user can select the specific media content and push the specific media content to other families (e.g., radio station family B 202b).

In some implementations, when pushed media content (e.g., a pushed media asset) is received by one family from another family, the receiving system can automatically check pre-defined rules to determine if the incoming media asset must be held for screening. For example, the predefined rules may specify that screening is to occur for certain types of music (e.g., classical or rap) or for media content from specific radio families (e.g., radio family A 202a). If a particular media asset is held for screening, then the media asset can be quarantined until a user at the receiving family approves the media asset. Such approval can occur, for example, through the use of one or more user interface screens.

In some implementations, during the approval process (e.g., of quarantined media content), the approver may manually manipulate the metadata of an incoming media asset. For example, the program director at radio station family B 202b may receive pushed content from radio station family A 202A, such as a Spanish jazz song that is categorized as jazz. However, the user may wish to change the metadata, such as to further classify the song as a Spanish language song.

Figure 4:
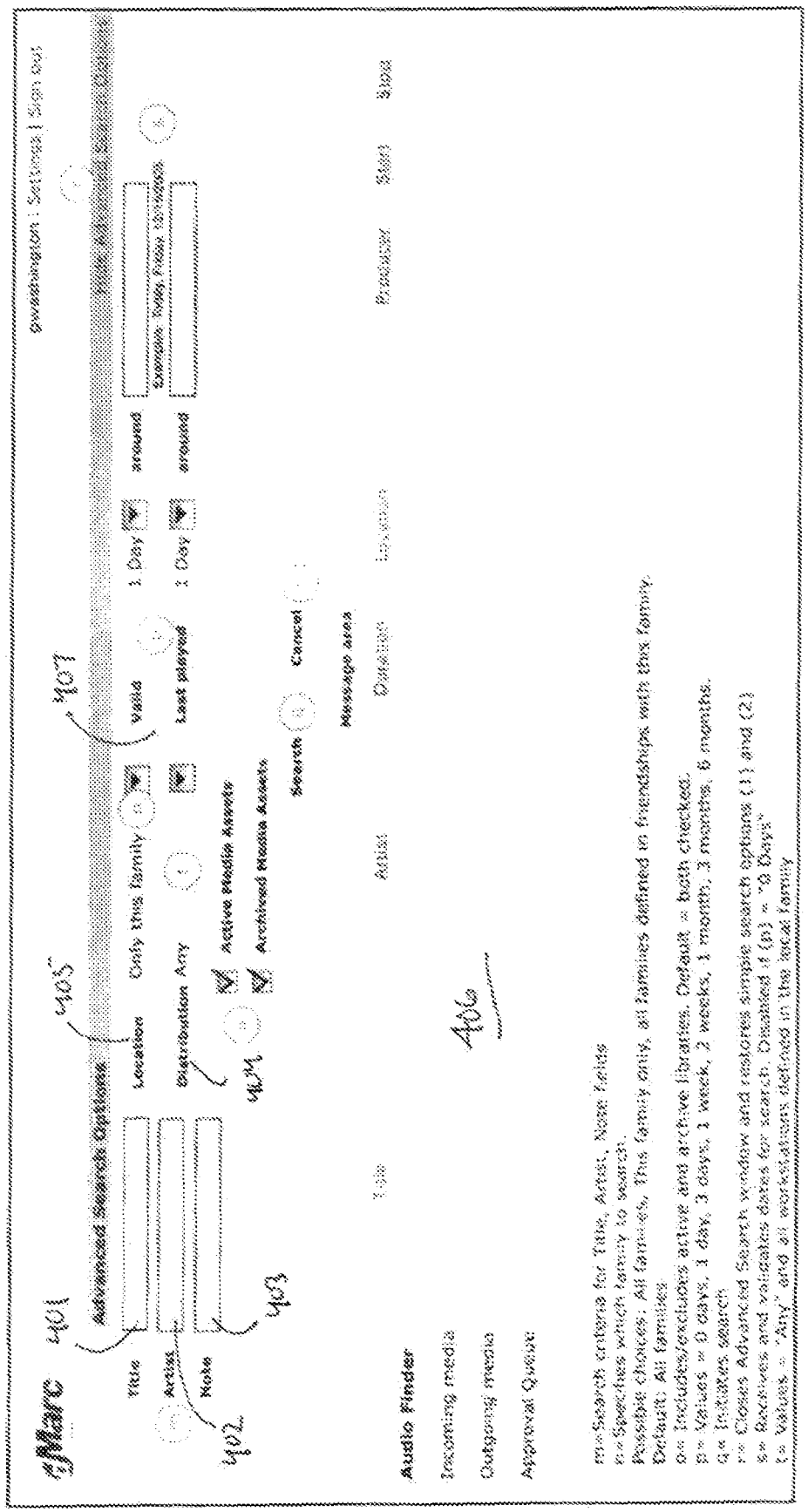
FIG. 4 is an exemplary user interface used to search media content of radio stations within radio families.

FIG. 4 is an exemplary user interface (UI) 400, which is generated by application 126, and which used to search media content of radio stations within radio families. In this implementation, the user interface includes various search fields that allow a user to specify parameters for a search. These search fields include, but are not limited to, a title field 401 for specifying the title of media content to download, an artist field for specifying an artist who created the media content, and a note field 403 for specifying any other information that may be relevant to the search. A location field 405 specifies where the search is to be conducted. For example, the search may be conducted only in the current family, in all families, or in selected families. A drop down box (not shown) may be provided allowing the user to select families for the search or to select family friendships for the search. A distribution field 404 maybe used to specify among which radio stations the media content is to be distributed (e.g., specific stations, families, or friendships). Temporal fields 407 allow a user to search for new media content over specified periods of time, e.g., media content that was introduced or played within the previous day or some other specified time period. Other fields that relate to the media content may include a composer field, a producer field, a user-defined category field, a free-form text field, a type number field, an advertiser number field, and other user-defined custom fields. Window 406 allows a user to track incoming and outgoing media content, as well as media content within an approval queue. Other search and/or informational fields may be provided on UI 400.

Figure 5:
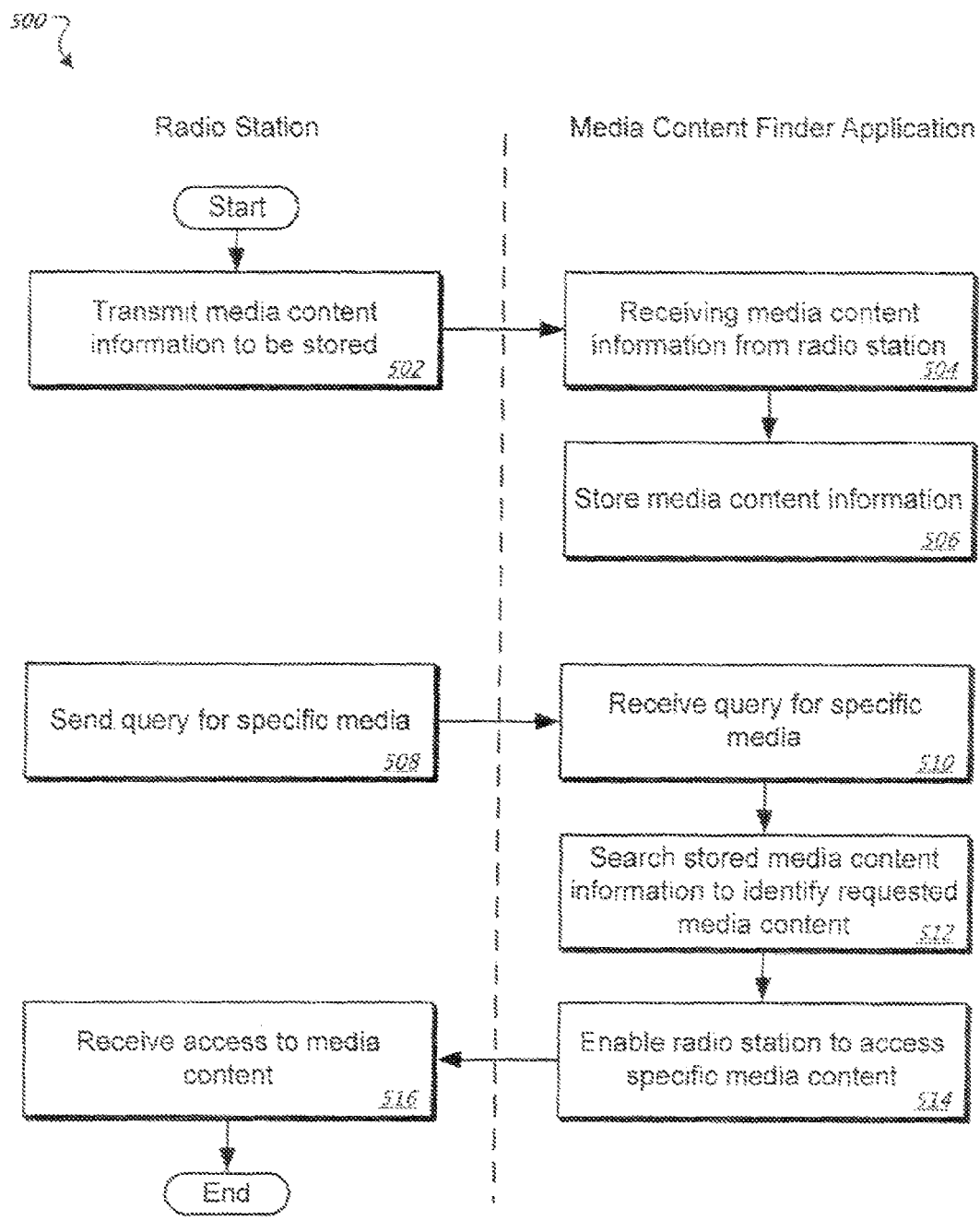
FIG. 5 is an exemplary flow diagram for a method of sharing media content within radio families.

FIG. 5 is an exemplary flow diagram for a method 500 of sharing media content among one or more radio station families. The method 500 can begin when a radio station (e.g., of radio family A) transmits media content information to be stored (502). For example, referring to FIG. 3, one of me radio stations 204 in radio station family A 202a may store music or ads as media content 116 and transmit metadata corresponding to the media content information to the media content finder application 126. For instance, if a song by Mannheim Steamroller is saved as media content 116 at radio station family A 202a, metadata associated with the song (e.g., the song title and other fields/attributes) can be sent to the application 126. The media content information is received (504) from one of the radio stations in the family. For example, the storage software module 302 can receive the metadata corresponding to the media content stored at the radio station family A 202a, such as the Mannheim Steamroller song.

The media content information is stored (506) such that the media content information is accessible to at least some of the families of radio stations via a computer network. For example, if a song or ad is stored locally as media content 116 at radio families 202a or 202b, the metadata corresponding to the song or ad can be stored in the media content index 312. Indexes in the media content index 312 can make it possible for radio stations to search for other radio families' media content information, such as metadata (e.g., song title, artist, etc.) relating to songs by Mannheim Steamroller. As additional instances of media content information are stored over time, storage software module 302 can make the corresponding updates to the media content index 312 (steps 502-506).

To find media content stored in the families of radio stations, a query can be sent (508). For example, a user (e.g., a program director) at the radio station family B 202b may send a query for a song (e.g., a specific song by Mannheim Steamroller) previously stored by a radio station 204 at radio station family A 202a. The query can he entered by the user via interface 320b (e.g., 400—see FIG. 4). The user may instead select from a collection of previously-entered queries obtained from the saved searches 314 and displayed in the interface 320b, such as in a pull-down list. For example, the user may select and submit a previously used query, such as one that lists Mannheim Steamroller songs recently stored by other radio families. In some implementations, the user may optionally modify a saved query before it is submitted.

As shown in FIG. 5, the query from the radio station for the specific media content is received (510) by the media content finder application. For example, the application 126 can receive a query from a radio station 204 in media family B 202b. In particular, the query can be from a program director trying to locate a specific song by Mannheim Steamroller that may have been stored by a radio station in another radio station family. The query can be received in the search software module 304.

Stored media content information is searched to identify the specific media content (512) that is the subject of the query. For example, the search software module 304 can use search terms from the search query it receives to access the media content index 312. Specifically, if the query contains a particular term (e.g., RECORDING_GROUP="Mannheim Steamroller"), corresponding indexes in the index 312 can be searched.

Application 126 enables the radio station to access (514) the specific media content, provided that the specific media content is identified among the stored media content information. For example, when the search software module 304 identifies media content matching the user's query, the application 126 can provide the user with access to the corresponding media content. Specifically, the application 126 can send to the user a link to the Mannheim Steamroller song stored in media content 116 at radio station family A 202a. The link may appear as a hyperlink displayed in the user's interlace 320b. In some implementations, providing access to the media content may include sending the actual media content to the user. For example, the application 126 may obtain the media content wherever it is stored (e.g., in radio station family A 202a) and transmit a copy of the media content via the network 102 to the user at a radio station 204 in radio station family B 202b. In another implementation, application 126 may instruct a radio station in radio station family A 202a to send the media content directly (e.g., to push the media content) to a radio station in radio station family B 202b.

The radio station that requested the specific media content receives the media content (516). For example, the user who initiated the query for the specific media content (e.g., a song by Mannheim Steamroller) can initiate a download of the song. In some implementations, the download may be initiated by clicking on a hyperlink displayed with the Mannheim Steamroller song title in the user's interface 320b. The download may occur via the network 102. In some implementations, the download can occur directly between radio families. For example, a copy of the audio content for the Mannheim Steamroller song stored in media content 116 in radio station family A 202a can be transmitted (e.g., pushed) to the media content 116 in radio station family B 202b (e.g., in response to instructions from media content finder application 126). In other implementations, the media content may be routed though the Web site or clearinghouse that hosts the application 126. Alter specific media content is copied to another radio station family, the media content index 312 can be updated to indicate another location at which the media content is stored. In this way, a user searching for a specific song (or ad) can discover that the song (or ad) is already available locally in media content 116.

Figure 6:
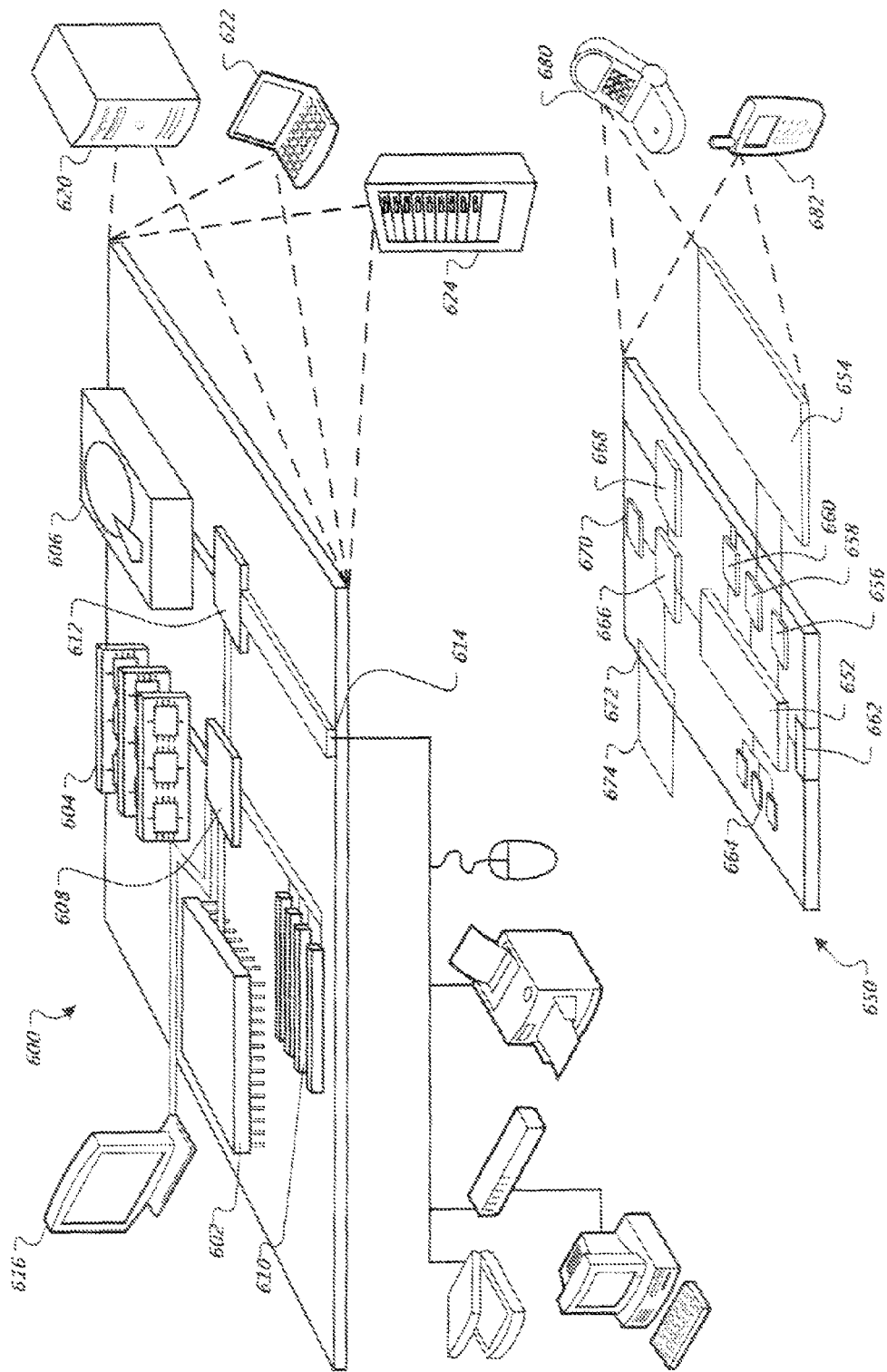
FIG. 6 is a block diagram of computing devices and systems.

FIG. 6 is a block diagram of computing devices 600, 650 that may be used to implement the systems and methods described in this document, as either a client or as a server or plurality observers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described herein and/or the claims of this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a machine-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interlaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e,g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically expansion memory 674 may include instructions to carry out or supplement the processes described above, and may include secure information also. Thus, for example, expansion memory 674 may be provide as a security software module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver software module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different terms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine Instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information, to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The media content described herein may include, but is not limited to, any type of broadcast content, such as individual songs, playlists, talk radio programming, text, images, video, and advertising. Media content finder application 126 may also be used to search for media content within a radio station family. For example, one radio station in family 202*a* may use media content finder application 126 to search for media content in another radio station in family 202*a*.

Elements of the different implementations described herein may be combined in a manner not specifically described to produce new implementations.

What is claimed is:

1. A method of sharing media content among families of broadcast stations, the method comprising:
   receiving information relating to media content from families of broadcast stations;
   storing the information such that the information is accessible to at least two of the families of broadcast stations via a computer network;
   receiving a query for specific media content from a broadcast station that is a member of a first family of broadcast stations, the specific media content being associated with a second family of broadcast stations that is different from the first family;
   searching the stored information in accordance with the query to identify the specific media content; and
   enabling the broadcast station to access to the specific media content if the specific media content is identified among the stored information.

2. The method of claim 1, wherein the information identifies media content by family of broadcast station and by one or more attributes of the media content.

3. The method of claim 2, wherein the one or more attributes comprises at least one of a title associated With the media content, an artist associated with the media content, notes associated with the media content, a composer associated with the media content, a producer associated with the media content, a category associated with the media content, a type number associated with the media content, an advertiser number associated with the media content and user-defined custom information.

4. The method of claim 3, further comprising;
   generating a graphical user interface (GUI) comprising one or more fields;
   wherein the query corresponds to information contained in the one or more fields of the GUI.

5. The method of claim 1, further comprising:
   generating a graphical user interface (GUI) comprising one or more options for accessing the specific media content;
   wherein enabling comprises;
   receiving a selection corresponding to the one or more options; and
   instructing a broadcast station that stores the specific media content to provide the specific media content to the broadcast station that issued the query.

6. The method of claim 5, wherein the one or more options comprise:
an option to obtain the specific media content immediately; and
an option to obtain the media content at a predefined time.

7. The method of claim 1, wherein the media content comprises music from the families of broadcast stations; and
wherein the media content is stored in one or more repositories that are communicatively coupled to the network.

8. The method of claim 1, wherein the broadcast stations comprise radio stations, and the method is performed at one or more computer systems that are separate from the families of broadcast stations.

9. A method of sharing media content among families of broadcast stations, the method comprising:
receiving information relating to media content for families of broadcast stations;
storing the information such that the information is accessible to at least one of the families of broadcast stations via a computer network;
receiving a query for specific media content from a broadcast station that is a member of a first family of broadcast stations, the specific media content being associated with a second family of broadcast stations that is different from the first family;
searching the information in accordance with the query to identify a location of the specific media content;
obtaining the specific media content from the location; and
providing the specific media content to the broadcast station.

10. The method of claim 9, further comprising:
generating a graphical user interface (GUI) comprising one or more fields;
wherein the query corresponds to information contained in the one or more fields of the GUI.

11. The method of claim 9, wherein the method is performed at a central server and the location of the specific media content comprises one or more servers that are remote from the central server, the one or more servers being communicatively coupled to the central server via one or more computer networks.

12. The method of claim 9, wherein the broadcast stations comprise radio stations, and the method is performed at one or more computer systems that are associated with a broadcast station that is a member of the second family.

13. A computing device comprising a computer program product stored on a computer readable medium, the stored computer program product including executable instructions for use in sharing media content among families of broadcast stations, the executable instructions for causing the computing device to perform functions comprising:
receiving information relating to media content from families of broadcast stations;
storing the information such that the information is accessible to at least two of the families of broadcast stations via a computer network;
receiving a query for specific media content from a broadcast station that is a member of a first family of broadcast stations, the specific media content being associated with a second family of broadcast stations that is different from the first family;
searching the stored information in accordance with the query to identify the specific media content; and
enabling the broadcast station to access to the specific media content if the specific media content is identified among the stored information.

14. The computing device of claim 13, wherein the information identifies media content by family of broadcast station and by one or more attributes of the media content.

15. The computing device of claim 14, wherein the one or more attributes comprises at least one of a title associated with the media content an artist associated with the media content, notes associated with the media content, a composer associated with the media content, a producer associated with the media content, a category associated with the media content, a type number associated with the media content, an advertiser number associated with the media content, and user-defined custom information.

16. The computing device of claim 15, further comprising executable instructions for causing the computing device to perform functions comprising:
generating a graphical user interface (GUI) comprising one or more fields;
wherein the query corresponds to information contained in the one or more fields of the GUI.

17. The computing device of claim 13, further comprising executable instructions for causing the computing device to perform functions comprising:
generating a graphical user interface (GUI) comprising one or more options for accessing the specific media content;
wherein enabling comprises;
receiving a selection corresponding to the one or more options; and
instructing a broadcast station that stores the specific media content to provide the specific media content to the broadcast station that issued the query.

18. The computing device of claim 17, wherein the one or more options comprise:
an option to obtain the specific media content immediately; and
an option to obtain the media content at a predefined time.

19. The computing device of claim 13, wherein the media content comprises music from the families of broadcast stations; and
wherein the media content is stored in one or more repositories that are communicatively coupled to the network.

20. The computing device of claim 13, wherein the broadcast stations comprise radio stations, and the computing device is resident at one or more computer systems that are separate from the families of broadcast stations.

21. A computing device comprising a computer program product stored on a computer readable medium, the stored computer program product including executable instructions for use in sharing media content among families of broadcast stations, the executable instructions for causing the computing device to perform functions comprising;
receiving information relating to media content for families of broadcast stations;
storing the information such that the information is accessible to at least one of the families of broadcast stations via a computer network;
receiving a query for specific media content from a broadcast station that is a member of a first family of broadcast stations, the specific media content being associated with a second family of broadcast stations that is different from the first family;
searching the information in accordance with the query to identify a location of the specific media content;
obtaining the specific media content from the location; and
providing the specific media content to the broadcast station.

22. The computing device of claim 21, further comprising executable instructions for causing the computing device to perform functions comprising;
  generating a graphical user interface (GUI) comprising one or more fields;
  wherein the query corresponds to information contained in the one or more fields of the GUI.

23. The computing device of claim 21, wherein the computing device is resident at a central server and the location of the specific media content comprises one or more servers that are remote from the central server, the one or more servers being communicatively coupled to the central server via one or more computer networks.

24. The computing device of claim 21, wherein the broadcast stations comprise radio stations, and the computing device is resident at one or more computer systems that are associated with a broadcast station that is a member of the second family.

25. The method of claim 9, further comprising:
  receiving other media content from another broadcast station among the families of broadcast stations; and
  screening the other media content in accordance with one or more predefined rules.

26. The method of claim 9, further comprising:
  receiving other media content from another broadcast station among the families of broadcast stations, the other media content having metadata associated therewith; and
  changing the metadata.

27. The computing device of claim 21, further comprising executable instructions for causing the computing device to perform functions comprising:
  receiving other media content from another broadcast station among the families of broadcast stations; and
  screening the other media content in accordance with one or more predefined rules.

28. The computing device of claim 21, further comprising executable instructions for causing the computing device to perform functions comprising:
  receiving other media content from another broadcast station among the families of broadcast stations, the other media content having metadata associated therewith; and
  changing the metadata.

* * * * *

UNITED STATES PATENT AND TRADEMARK OFFICE
CERTIFICATE OF CORRECTION

PATENT NO. : 7,925,201 B2  
APPLICATION NO. : 11/735262  
DATED : April 12, 2011  
INVENTOR(S) : Irvin et al.

Page 1 of 4

It is certified that error appears in the above-identified patent and that said Letters Patent is hereby corrected as shown below:

In the Claims:

Column 16, lines 24-41, Claim 1 reads

"1. A method of sharing media content among families of broadcast stations, the method comprising:

receiving information relating to media content from families of broadcast stations; storing the information such that the information is accessible to at least two of the families of broadcast stations via a computer network;

receiving a query for specific media content from a broadcast station that is a member of a first family of broadcast stations, the specific media content being associated with a second family of broadcast stations that is different from the first family;

searching the stored information in accordance with the query to identify the specific media content; and enabling the broadcast station to access to the specific media content if the specific media content is identified among the stored information."

Should read

--1. A method of sharing media content among families of broadcast stations, the method comprising:

receiving information relating to media content from families of broadcast stations; storing the information such that the information is accessible to at least two of the families of broadcast stations via a computer network;

receiving a query for specific media content from a broadcast station that is a member of a first family of broadcast stations, the specific media content being associated with a second family of broadcast stations that is different from the first family;

searching the stored information in accordance with the query to identify the specific media content; and Signed and Sealed this
Twenty-fifth Day of February, 2014

Michelle K. Lee
*Deputy Director of the United States Patent and Trademark Office* enabling the broadcast station to access to the specific media content if the specific media content is identified among the stored information, wherein each family of broadcast stations is owned or operated by a common broadcasting entity.--

In Column 17, lines 14-30, Claim 9 reads

"9. A method of sharing media content among families of broadcast stations, the method comprising:

receiving information relating to media content for families of broadcast stations;

storing the information such that the information is accessible to at least one of the families of broadcast stations via a computer network;

receiving a query for specific media content from a broadcast station that is a member of a first family of broadcast stations, the specific media content being associated with a second family of broadcast stations that is different from the first family;

searching the information in accordance with the query to identify a location of the specific media content;

obtaining the specific media content from the location; and providing the specific media content to the broadcast station."

Should read

--9. A method of sharing media content among families of broadcast stations, the method comprising:

receiving information relating to media content for families of broadcast stations;

storing the information such that the information is accessible to at least one of the families of broadcast stations via a computer network;

receiving a query for specific media content from a broadcast station that is a member of a first family of broadcast stations, the specific media content being associated with a second family of broadcast stations that is different from the first family;

searching the information in accordance with the query to identify a location of the specific media content;

obtaining the specific media content from the location; and providing the specific media content to the broadcast station, wherein each family of broadcast stations is owned or operated by a common broadcasting entity.--

In Column 17, lines 47-67, Claim 13 reads

"13. A computing device comprising a computer program product stored on a computer readable medium, the stored computer program product including executable instructions for use in sharing media content among families of broadcast stations, the executable instructions for causing the computing device to perform functions comprising:

receiving information relating to media content from families of broadcast stations;

storing the information such that the information is accessible to at least two of the families of broadcast stations via a computer network;

receiving a query for specific media content from a broadcast station that is a member of a first family of broadcast stations, the specific media content being associated with a second family of broadcast stations that is different from the first family;

searching the stored information in accordance with the query to identify the specific media content; and enabling the broadcast station to access to the specific media content if the specific media content is identified among the stored information."

Should read

--13. A computing device comprising a computer program product stored on a computer readable medium, the stored computer program product including executable instructions for use in sharing media content among families of broadcast stations, the executable instructions for causing the computing device to perform functions comprising:

receiving information relating to media content from families of broadcast stations;

storing the information such that the information is accessible to at least two of the families of broadcast stations via a computer network;

receiving a query for specific media content from a broadcast station that is a member of a first family of broadcast stations, the specific media content being associated with a second family of broadcast stations that is different from the first family;

searching the stored information in accordance with the query to identify the specific media content; and enabling the broadcast station to access to the specific media content if the specific media content is identified among the stored information, wherein each family of broadcast stations is owned or operated by a common broadcasting entity.--

In Column 18, lines 47-67, Claim 21 reads

"21. A computing device comprising a computer program product stored on a computer readable medium, the stored computer program product including executable instructions for use in sharing media content among families of broadcast stations, the executable instructions for causing the computing device to perform functions comprising;

receiving information relating to media content for families of broadcast stations;

storing the information such that the information is accessible to at least one of the families of broadcast stations via a computer network;

receiving a query for specific media content from a broadcast station that is a member of a first family of broadcast stations, the specific media content being associated with a second family of broadcast stations that is different from the first family;

searching the information in accordance with the query to identify a location of the specific media content;

obtaining the specific media content from the location; and providing the specific media content to the broadcast station."

Should read

--21. A computing device comprising a computer program product stored on a computer readable medium, the stored computer program product including executable instructions for use in sharing media content among families of broadcast stations, the executable instructions for causing the computing device to perform functions comprising;

receiving information relating to media content for families of broadcast stations;

storing the information such that the information is accessible to at least one of the families of broadcast stations via a computer network;

receiving a query for specific media content from a broadcast station that is a member of a first family of broadcast stations, the specific media content being associated with a second family of broadcast stations that is different from the first family;

searching the information in accordance with the query to identify a location of the specific media content;

obtaining the specific media content from the location; and providing the specific media content to the broadcast station, wherein each family of broadcast stations is owned or operated by a common broadcasting entity.--